(12) United States Patent
Pierson

(10) Patent No.: US 11,675,587 B2
(45) Date of Patent: Jun. 13, 2023

(54) ENHANCED PROTECTION OF PROCESSORS FROM A BUFFER OVERFLOW ATTACK

(71) Applicant: Forrest L. Pierson, Dallas, TX (US)

(72) Inventor: Forrest L. Pierson, Dallas, TX (US)

(*) Notice: Subject to any disclaimer, the term of this patent is extended or adjusted under 35 U.S.C. 154(b) by 0 days.

(21) Appl. No.: 17/402,117

(22) Filed: Aug. 13, 2021

(65) Prior Publication Data

US 2021/0373891 A1    Dec. 2, 2021

Related U.S. Application Data

(63) Continuation-in-part of application No. PCT/US2021/043374, filed on Jul. 28, 2021, and a
(Continued)

(51) Int. Cl.
*G06F 9/30* (2018.01)
*G06F 9/34* (2018.01)
(Continued)

(52) U.S. Cl.
CPC ........ *G06F 9/30058* (2013.01); *G06F 9/3001* (2013.01); *G06F 9/3016* (2013.01);
(Continued)

(58) Field of Classification Search
None
See application file for complete search history.

(56) References Cited

U.S. PATENT DOCUMENTS

| 4,441,075 A | 4/1984 | McMahon |
| 5,022,025 A | 6/1991 | Urushidani et al. |

(Continued)

FOREIGN PATENT DOCUMENTS

| EP | 2974158 A1 | 1/2016 |
| WO | 2014164036 A1 | 10/2019 |

OTHER PUBLICATIONS

P.Philippaerts et al., Code Pointer Masking: Hardening Applications against Injection Attacks, 2011, Springer, Detection of Intrusions and Malware, and Vulnerability Assessment pp. 194-213.. (Year: 2011).*

(Continued)

*Primary Examiner* — Eric Coleman
(74) *Attorney, Agent, or Firm* — NK Patent Law

(57) ABSTRACT

A method for changing a processor instruction randomly, covertly, and uniquely, so that the reverse process can restore it faithfully to its original form, making it virtually impossible for a malicious user to know how the bits are changed, preventing them from using a buffer overflow attack to write code with the same processor instruction changes into said processor's memory with the goal of taking control of the processor. When the changes are reversed prior to the instruction being executed, reverting the instruction back to its original value, malicious code placed in memory will be randomly altered so that when it is executed by the processor it produces chaotic, random behavior that will not allow control of the processor to be compromised, eventually producing a processing error that will cause the processor to either shut down the software process where the code exists to reload, or reset.

14 Claims, 5 Drawing Sheets

Related U.S. Application Data continuation-in-part of application No. 16/792,432, filed on Feb. 17, 2020, now Pat. No. 11,119,769, which is a continuation of application No. 15/356,992, filed on Nov. 21, 2016, now Pat. No. 10,564,969.

(60) Provisional application No. 63/073,355, filed on Sep. 1, 2020, provisional application No. 63/065,656, filed on Aug. 14, 2020, provisional application No. 63/058,652, filed on Jul. 30, 2020, provisional application No. 62/262,615, filed on Dec. 3, 2015.

(51) Int. Cl.
  *G06F 12/0875* (2016.01)
  *G06F 12/0891* (2016.01)
  *G06F 21/52* (2013.01)
  *G06F 12/14* (2006.01)

(52) U.S. Cl.
  CPC ...... *G06F 9/30156* (2013.01); *G06F 9/30178* (2013.01); *G06F 9/30185* (2013.01); *G06F 9/34* (2013.01); *G06F 12/0875* (2013.01); *G06F 12/0891* (2013.01); *G06F 21/52* (2013.01); *G06F 12/1408* (2013.01); *G06F 2212/1052* (2013.01); *G06F 2212/452* (2013.01)

(56) References Cited

U.S. PATENT DOCUMENTS

| | | | |
|---|---|---|---|
| 5,477,536 | A | 12/1995 | Picard |
| 6,594,229 | B1 | 7/2003 | Gregorat |
| 7,002,908 | B1 | 2/2006 | Lund et al. |
| 7,327,760 | B1 | 2/2008 | Parruck et al. |
| 7,352,745 | B2 | 4/2008 | Perera et al. |
| 7,542,464 | B2 | 6/2009 | Fraser |
| 7,616,646 | B1 | 11/2009 | Ma et al. |
| 7,881,279 | B2 | 2/2011 | Ooms |
| 8,164,272 | B2 | 4/2012 | Ribarich |
| 8,345,675 | B1 | 1/2013 | Raghunath |
| 8,397,081 | B2 | 3/2013 | Dahan et al. |
| 9,128,690 | B2 | 9/2015 | Lotzenburger et al. |
| 9,967,092 | B2 | 5/2018 | Henry et al. |
| 9,977,749 | B2 | 5/2018 | Kim et al. |
| 2001/0051539 | A1 | 12/2001 | Zach |
| 2002/0032891 | A1 | 3/2002 | Yada |
| 2002/0080790 | A1 | 6/2002 | Beshai |
| 2002/0124161 | A1 | 9/2002 | Moyer |
| 2003/0012179 | A1 | 1/2003 | Yano et al. |
| 2003/0048781 | A1 | 3/2003 | Pierson |
| 2004/0030970 | A1 | 2/2004 | Chen |
| 2004/0032856 | A1 | 2/2004 | Sandstrom |
| 2004/0105548 | A1 | 6/2004 | Fujiwara |
| 2004/0123122 | A1 | 6/2004 | Asai et al. |
| 2004/0172557 | A1* | 9/2004 | Nakae ............... H04L 63/20 726/22 |
| 2004/0208314 | A1* | 10/2004 | Patariu ............. H04L 9/0637 380/37 |
| 2005/0257070 | A1* | 11/2005 | Wen ............... H04L 9/0894 712/E9.037 |
| 2006/0023640 | A1 | 2/2006 | Chang et al. |
| 2007/0136561 | A1 | 6/2007 | Whalley et al. |
| 2007/0147364 | A1 | 6/2007 | Palacharla et al. |
| 2007/0248115 | A1 | 10/2007 | Miller et al. |
| 2008/0134297 | A1 | 6/2008 | Clinick |
| 2008/0219254 | A1 | 9/2008 | Haney |
| 2008/0282087 | A1 | 11/2008 | Stollon et al. |
| 2008/0301537 | A1 | 12/2008 | Isono |
| 2009/0092248 | A1 | 4/2009 | Rawson |
| 2009/0154475 | A1 | 6/2009 | Lautenschlaeger |
| 2009/0201909 | A1 | 8/2009 | Bou-Diab et al. |
| 2010/0132046 | A1 | 5/2010 | Saliba et al. |
| 2010/0165984 | A1 | 7/2010 | Aybay et al. |
| 2011/0067110 | A1* | 3/2011 | Markey ............. G06F 21/74 712/229 |
| 2011/0135312 | A1 | 6/2011 | El-Ahmadi et al. |
| 2011/0277035 | A1* | 11/2011 | Singh ............. G06F 21/52 711/E12.001 |
| 2011/0299386 | A1 | 12/2011 | Negoto et al. |
| 2011/0317559 | A1 | 12/2011 | Kern et al. |
| 2012/0089754 | A1 | 4/2012 | Su et al. |
| 2012/0147744 | A1 | 6/2012 | Lee |
| 2012/0271961 | A1 | 10/2012 | Alshinnawi et al. |
| 2012/0287926 | A1 | 11/2012 | Anantharam et al. |
| 2013/0333009 | A1 | 12/2013 | Mackler |
| 2014/0173293 | A1* | 6/2014 | Kaplan ............. G06F 21/54 713/190 |
| 2014/0269738 | A1 | 9/2014 | Pierson |
| 2015/0009743 | A1 | 1/2015 | Chung |
| 2016/0231380 | A1 | 8/2016 | Whetsel et al. |
| 2016/0321178 | A1 | 11/2016 | Wu |
| 2016/0364343 | A1 | 12/2016 | Case et al. |
| 2017/0093804 | A1* | 3/2017 | Boivie ............. H04L 63/10 |
| 2018/0359230 | A1* | 12/2018 | Lerner ............. H04L 9/12 |

OTHER PUBLICATIONS

ISA/US; International Search Report and Written Opinion for International Patent Application No. PCT/US14/20089 dated Aug. 20, 2014, 13 pages.
WIPO; International Preliminary Report on Patentability for International Patent Application No. PCT/US14/20089 dated Sep. 15, 2015, 10 pages.
USPTO; Non-Final Office Action for U.S. Appl. No. 15/202,379 dated Apr. 6, 2018, 10 pages.
USPTO; Non-Final Office Action for U.S. Appl. No. 16/261,279 dated Sep. 5, 2019, 12 pages.
CIPO; Office Action for Canadian Patent Application No. 2,904,659 dated Sep. 16, 2016, 3 pages.
CIPO; Office Action for Canadian Patent Application No. 2,904,659 dated Apr. 7, 2017, 3 pages.
CIPO; Office Action for Canadian Patent Application No. 2,904,659 dated Feb. 27, 2018, 4 pages.
CIPO; Office Action for Canadian Patent Application No. 2,904,659 dated Oct. 11, 2018, 4 pages.
EPO; Extended European Search Report for European Patent Application No. 14778494.6 dated May 16, 2017, 11 pages.
USPTO; Non-Final Office Action for U.S. Appl. No. 14/021,563 dated Aug. 18, 2016, 22 pages.
USPTO; Non-Final Office Action for U.S. Appl. No. 14/021,563 dated Mar. 13, 2015, 47 pages.
USPTO; Final Office Action for U.S. Appl. No. 14/021,563 dated Jul. 28, 2015, 21 pages.
EPO; Supplementary Partial European Search Report for European Patent Application No. 14778494.6 dated Feb. 13, 2017, 8 pages.
CIPO; Office Action for Canadian Patent Application No. 2,904,659 dated Feb. 22, 2017, 3 pages.
USPTO; Non-Final Office Action for U.S. Appl. No. 16/792,432 dated Jan. 7, 2021, 16 pages.
USPTO; Non-Final Office Action for U.S. Appl. No. 15/356,992 dated Nov. 19, 2018, 22 pages.
USPTO; Final Office Action for U.S. Appl. No. 15/356,992 dated Jun. 13, 2019, 16 pages.
ISA/RU; International Search Report and Written Opinion for International Patent Application No. PCT/US2021/043374 dated Oct. 28, 2021, 8 pages.
WIPO; International Preliminary Report on Patentability for International Patent Application No. PCT/US2021/043374 dated Feb. 9, 2023, 7 pages.

\* cited by examiner

ENHANCED PROTECTION OF PROCESSORS FROM A BUFFER OVERFLOW ATTACK

CROSS REFERENCE TO RELATED APPLICATION

This application is a continuation-in-part (CIP) of U.S. Utility patent application Ser. No. 16/792,432, titled "ENHANCED PROTECTION OF PROCESSORS FROM A BUFFER OVERFLOW ATTACK," filed on Feb. 17, 2020, which is a continuation of U.S. Utility patent application Ser. No. 15/356,992, issued as U.S. Pat. No. 10,564,969 on Feb. 18, 2020, titled "ENHANCED PROTECTION OF PROCESSORS FROM A BUFFER OVERFLOW ATTACK," filed on Nov. 21, 2016, which claims the benefit of U.S. Provisional Patent Application No. 62/262,615, titled "METHOD AND TECHNIQUE FOR DEFEATING BUFFER OVERFLOW PROBLEMS IN PROCESSORS," filed on Dec. 3, 2015, all of which are commonly owned, the disclosures of which are all incorporated herein by reference in their entirety.

This application also is a bypass continuation-in-part (CIP) of PCT Patent Application No. PCT/US21/43374, titled "AN ENHANCED PROCESSOR DATA TRANSPORT MECHANISM FOR INCREASED THROUGHPUT AND MITIGATION OF DATA STARVATION," filed on Jul. 28, 2021, which claims the benefit of U.S. Provisional Patent Application No. 63/058,652, titled "AN ENHANCED PROCESSOR DATA TRANSPORT MECHANISM FOR INCREASED THROUGHPUT AND MITIGATION OF DATA STARVATION," filed on Jul. 30, 2020, all of which are commonly owned, the disclosures of which are all incorporated herein by reference in their entirety.

This application also claims priority to U.S. Provisional Patent Application No. 63/065,656, titled "ADDITIONAL IMPROVEMENTS AND ENHANCED PROTECTION OF PROCESSORS FROM A BUFFER OVERFLOW ATTACK," filed on Aug. 14, 2020, and claims priority to U.S. Provisional Patent Application No. 63/073,355, titled "ADDITIONAL IMPROVEMENTS AND ENHANCED PROTECTION OF PROCESSORS FROM A BUFFER OVERFLOW ATTACK," filed on Sep. 1, 2020, all of which are commonly owned, the disclosures of which are all incorporated herein by reference in their entirety.

This application is also related to U.S. Utility patent application Ser. No. 16/261,279, issued as U.S. Pat. No. 10,673,783 on Jun. 2, 2020, titled "INDEFINITELY EXPANDABLE HIGH-CAPACITY DATA SWITCH," filed on Jan. 29, 2019, the disclosure of which is incorporated herein by reference in its entirety.

TECHNICAL FIELD

The present disclosure relates to digital processors. More particularly, the present disclosure relates to network attachable digital processors.

BACKGROUND

Traditional digital processors (processor) are complex logic devices that execute user instructions in a sequential fashion to produce a desired result for the user. Referring to FIG. 1, these instructions are stored in a Memory 101, and are read from Memory 101 and executed by the processor. Instructions differ from other instructions by the sequence of bits inside the instruction. Each bit can assume one of two states, providing two possible outcomes. One state is arbitrarily called a 'zero' state, often represented by the number '0', and the other state is called a 'one' state, often represented by the number '1'. Other nomenclature may be used to describe these two states, including but not limited to terms such as 'on' and 'off', 'set' and 'clear', or 'high' and 'low'. There are also technologies that can encode three or more states into a single bit of information, however, at present the state of the art in electronics needed to implement three or more states in a bit is of sufficient complexity and size that it takes fewer transistors to implement two bits of two states each (which can provide up to four possible states between the two bits) than it does to implement a single bit with three or four states. Regardless of whether the bits in an instruction represent two states each, or more than two states each, each instruction is defined by the state of each bit and the order with which the bits are placed in the instruction.

One of the more novel features processors can provide for society is the ability to electronically control the flow of large quantities of data through a communications network called the World Wide Web or the Internet. The Internet today has become so intertwined with society that, for example, it is now used to do searches for information that used to take people hours, days, or even longer to perform by hand. The Internet is also used to process the transfer of funds and other banking services, engage in on-line shopping, send and receive pictures, books or papers, prerecorded or live video, music, and sound, and control much of society's utility infrastructure.

Sadly, there are people who seek to malevolently take control of processors connected to the Internet to disrupt commerce, engage in acts of theft, vandalism, sabotage, or revenge, inconvenience people or disrupt their lives, or even endanger people and damage society's infrastructure by changing the sequence of instructions inside a processor's Main Memory 101a. The new sequences maliciously placed in processors' Main Memory 101a can instruct equipment that controls society's utilities to engage in damaging behavior, violate safety protocols (and thus endanger people or the environment), compromise personal, privileged, or classified information, shut down utilities, improperly move funds around, or by taking over a sufficient number of processors, instruct them to simultaneously send service requests to overwhelm other processors and shut them down. If the disruption is to processors controlling society's infrastructure and the disruption is successful at shutting down something such as electrical power, if not restored soon chaos could result, plunging society into anarchy.

To mitigate the hostile takeover of processors, a series of protective responses have been developed. These responses include firewalls, which are specialized processors designed to recognize invalid attempts to pass Internet traffic from the unprotected Internet to a protected localized network, and block such traffic.

Another product is a Gateway, which changes, or translates, the Internet addresses of processors inside a protected local network before the request goes to the unprotected Internet. The Gateway was initially invented in part to help circumvent the shortage of Internet Protocol addresses on the Internet by isolating a private network from the Internet. The private network could then contain tens of thousands of Internet Protocol addresses also in use on the Internet, even if the Gateway only had a handful of addresses on the Internet side. When a request for an Internet connection came through the Gateway from the protected side, it would translate the internal address on the private network into a public Internet address on the unprotected side and send the request out, keep track of the transaction so that when it returned the Gateway would re-translate the address back to the private network address, and send the results back to the private network for routing. As a result of this function, the Gateway hid the structure and real addresses of the private network from the Internet. Thus, malicious parties on the unprotected Internet do not know the true nature of the structure of the protected local network. Further, if the Gateway receives a request to communicate with a processor it doesn't have a record of asking for such a communication, it stops the communications attempt (many firewalls also perform this function).

Other attempts at mitigating the hostile takeover of a processor, called a virus scanner, place specialized software on the processor that scans all Internet traffic going into it for patterns of behavior that are inappropriate or malicious code and stop them prior to being acted upon.

Most methods of mitigating hostile attempts to take over network connected processors have been so successful that only one method still remains, the 'Buffer Overflow Attack'. See "Tools for Generating and Analyzing Attack Graphs" by Oleg Sheyner and Jeannette Wing, Carnegie Mellon University, Computer Science Department, 5000 Forbes Avenue, Pittsburgh, Pa. 15213, published in 2004, referencing page 357, FIG. 4 and the text between it and the start of section 4.2. Per the specified text in this paper, a properly configured and resourceful firewall will be sufficiently successful at stopping malicious internet intrusions that only a Buffer Overflow Attack (BOA) will succeed in taking control of processors protected by the firewall. This makes the BOA a prime source of attacks on firewall or gateway protected processors.

The BOA utilizes a weakness in the 'C' programming language (and several other computer languages). This weakness is that when a buffer in Main Memory 101a is set aside to temporarily hold incoming data (typically from the Internet), the programming language does not provide for a check to determine if the incoming data exceeds the buffer's size, overflowing it. An analogy would be to fill a glass with water on a restaurant table from a pitcher and not stop pouring water when the cup is full, spilling water all over the table as a result. Thus data written to the buffer could accidently, or maliciously in the event of a BOA, overflow past the boundary of the buffer and overwrite instructions in adjacent block of instructions in Main Memory 101a. If the data is actually malicious code intended to take control of the processor, and the Main Memory 101a adjacent to the buffer that is overflowing contains executable code, then the well behaved code will be overwritten by malicious code. The next time the code in the overflowed Main Memory 101a is executed, the processor becomes compromised.

Attempts to mitigate the BOA, such as logically separating blocks of Main Memory 101a so that locations where executable code reside is not always adjacent to incoming buffers, have been implemented. All of these attempts have reduced, but not eliminated BOAs. A different approach that provides a reliable means of stopping BOAs is needed.

SUMMARY

This summary is provided to introduce in a simplified form concepts that are further described in the following detailed descriptions. This summary is not intended to identify key features or essential features of the claimed subject matter, nor is it to be construed as limiting the scope of the claimed subject matter.

In at least one embodiment, a digital processor includes: all the necessary components of a traditional digital processor, including a Processor Memory Interface (PMI), Instruction Register (IR), a set of Processor Registers for storing temporary values including a Program Counter, a section of logic to decode instructions called the Instruction Execution Circuitry (IEC), an Arithmetic Logic Unit (ALU) to perform mathematical and logical operations on data, and special bits called Flags that store the processor state as well as the status of logic and mathematical operations of the previous instruction(s) for the purpose of providing a conditional branch instruction with the means of making the correct decision as to whether or not perform a branch operation; said processor containing additional components to store a Seed Value in a Command Encryption Register (CER) that instructs a bit modification circuit to change bit states and/or positions of bits in an instruction before it goes into the IR, plus the bit modification circuit (decryption circuit) capable of modifying bit states and/or bit positions before an instruction is stored into the IR, and a means of selecting the output of the decryption circuit or bypassing the decryption circuit while placing instructions in the IR, and a latch that selects between the output of the decryption circuit or bypassing the output of the decryption circuit; said decryption circuit designed to modify instructions at a sufficient rate that it will not slow the processor down; said latch can only be changed to bypass the decryption circuit by a processor reset, and changed to select the decryption circuit by an instruction that is decoded by the IEC to do so; and said instruction that changes the latch to select the decryption circuitry will optionally change the value in the PC to point to a different part of memory for code execution, and if the processor also contains Cache 101c, declare the contents of Cache 101c invalid so any unencrypted instructions in the Cache 101c will no longer be executed.

In at least one example, the digital processor further includes a second bit modification circuit (encryption circuit) that will utilize the same Seed Value used by the decryption circuit to take an instruction and modify it such that when said modified instruction is passed through the decryption circuit it will be returned to its original value; said encryption circuit containing a latch that is written to by the processor with an unmodified instruction and read out with an encrypted instruction that is to be stored in memory for later execution.

In at least one example, the digital processor further includes a random number generator capable of generating the Seed Value that can be placed in the CER such that the processor does not have access to the Seed Value to prevent unintentional disclosure of the Seed Value.

In at least one example, the digital processor further includes a Cache 101c to reduce the wait time for reading instructions or data from memory for commonly used instructions or data, where the Cache 101c contents will all be declared invalid when the instruction that changes the latch to select the decryption circuitry and optionally the value of the PC is executed.

In at least one example, the digital processor further includes a latch that selects between decrypted instructions and un-decrypted instructions after having been set to select decrypted instructions, including a means of: allowing the IEC to select between decrypted instructions and un-decrypted data read from memory through the PMI to be placed in one of the Processor Registers, the Flags, or the ALU; wherein the IEC shall always select decrypted instructions when placing immediate data into one of the Process Registers, the Flags, or the ALU, or instructions that provide modifications to the indexed address, or an extended address.

In at least one example, the digital processor further includes two separate internal processor data busses, one said busses carrying decrypted information from the Processor Memory Interface (PMI) and the other one of said busses carrying un-decrypted information from the PMI, the purpose for which is to: allow the IEC to choose whether to store decrypted information or un-decrypted information into a Processor Register, the input to the ALU, or Flags; thereby allowing the processor to encrypt all instructions stored in main memory without having to determine which instruction is meant for the IR and which instructions are meant for other destinations in the processor including the Processor Registers, ALU, or Flags, thereby allowing the Boot Code 101*b* as well as those portions of the software operating system that load encrypted instructions into Main Memory 101*a* the ability to do so without having to determine whether or not the instruction is intended solely for the IR.

In at least one example, the digital processor contains multiple different encryption/decryption algorithms within the encryption circuitry and decryption circuitry: allowing the printed circuit board (PCB) manufacturer to use an external serial programmable read-only memory to store a configuration selection that randomly selects a small subset of the encryption/decryption algorithms in a PCB-by-PCB basis, so that malevolent users by being aware of the lot number or date of manufacture of a PCB cannot determine which algorithm is used; the serial programmable read-only memory can be programmed by a bed-of-nails tester or other PCB verification tool to load different configurations; and the serial programmable read-only memory can be optionally configured so that its contents cannot be modified unless it is connected to a PCB verification tool.

A method is provided for changing a processor instruction randomly, covertly, and uniquely, so that the reverse process can restore it faithfully to its original form, making it virtually impossible for a malicious user to know how the bits are changed, preventing them from using a buffer overflow attack to write code with the same processor instruction changes into said processor's memory with the goal of taking control of the processor. When the changes are reversed prior to the instruction being executed, reverting the instruction back to its original value, malicious code placed in memory will be randomly altered so that when it is executed by the processor it produces chaotic, random behavior that will not allow control of the processor to be compromised, eventually producing a processing error that will cause the processor to either shut down the software process where the code exists to reload, or reset.

BRIEF DESCRIPTION OF THE DRAWINGS

The previous summary and the following detailed descriptions are to be read in view of the drawings, which illustrate particular exemplary embodiments and features as briefly described below. The summary and detailed descriptions, however, are not limited to only those embodiments and features explicitly illustrated.

DETAILED DESCRIPTIONS

Figure 1:
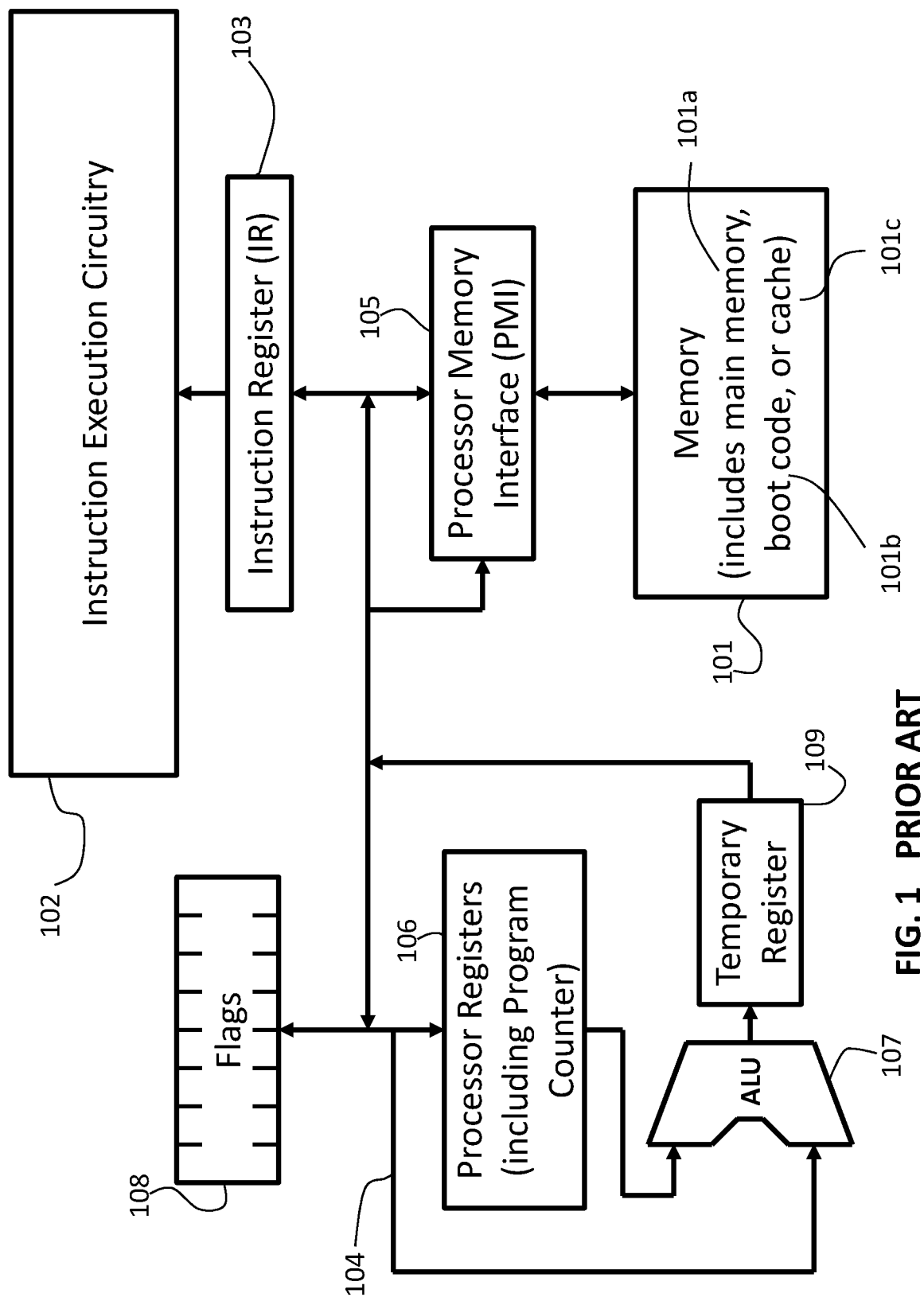
FIG. 1 depicts an embodiment of the prior art.

These descriptions are presented with sufficient details to provide an understanding of one or more particular embodiments of broader inventive subject matters. These descriptions expound upon and exemplify particular features of those particular embodiments without limiting the inventive subject matters to the explicitly described embodiments and features. Considerations in view of these descriptions will likely give rise to additional and similar embodiments and features without departing from the scope of the inventive subject matters. Although the term "step" may be expressly used or implied relating to features of processes or methods, no implication is made of any particular order or sequence among such expressed or implied steps unless an order or sequence is explicitly stated.

Functional implementations according to one or more embodiments are illustrated in the drawings. The following definitions may be used in the drawings and in these descriptions:

Boot Code Instructions executed by a processor when it first comes out of reset. Boot Code 101*b* has the privilege of always being stored in a non-volatile memory that cannot be modified by malicious users (in a properly designed processor), which always allows a processor to come out of reset in a known state.

Encryption Algorithm Specially designed hardware logic or a sequence of processor instructions that modifies the contents of a new instruction being stored to memory so that when it is decrypted it will be returned to its original value.

Decryption Algorithm Specially designed hardware logic or a sequence of processor instructions that modifies the contents of an encrypted instruction so that it is returned to its original value. Note that decryption step does not involve writing decrypted instructions back to memory, so the memory contents remain encrypted even after being read.

Seed Value A randomly generated number that determines how an encryption algorithm is used to encrypt instructions, and how a decryption algorithm is used to decrypt instructions. Additionally a seed value may be a register used to store a random number generated by a random number generator in the processor, either a random number generator unique to the encryption/decryption process, or the processor's own random number generator if it already possesses one. The bits of the seed value modify the instructions passing through an Encryption Register, and reverse said modification prior to instructions entering the Instruction Register, based on one or more algorithms that specify how the bits of the seed value modify these instructions.

Non-volatile Memory Memory whose contents are preserved when power is removed.

Volatile Memory Memory whose contents are not preserved when power is removed.

Cache A small memory that is external to the processor, but is much, much faster to access than most volatile memory. Usually cache is located inside the same integrated circuit that the processor is located in. Because of its high access speed, Cache will cost more. However, due to its small size, the cost impact is trivial. Special logic is used to control Cache so that its contents will mirror the contents of the most commonly accessed portions of Main Memory 101a or Boot Code 101b. When a memory access to Main Memory 101a or Boot Code 101b is to a section that is mirrored in the Cache, the Cache is used rather than the Main Memory 101a or Boot Code 101b, reducing the wait time by the processor and speeding it up. This is often times called a cache hit. When a memory access to Main Memory 101a or Boot Code 101b is to a location that is not mirrored in Cache, then the processor must wait while the Main Memory 101a or Boot Code 101b responds. This is often times called a cache miss. During a cache miss, the logic managing the Cache will determine which part of Cache has been used the least in recent accesses and overwrite it with the contents of the Main Memory 101a's or Boot Code 101b's latest access to increase the chances of more cache hits in the future. When Cache contents are declared invalid, then they must be reloaded from Main Memory 101a or Boot Code 101b to be considered valid again.

Main Memory The bulk of a processor's memory, usually located outside the integrated circuit the processor is located in.

Read Only Memory A non-volatile memory whose contents cannot be modified.

Inter-Integrated Circuit A protocol that uses a minimum number of pins to transfer data between a master device such as a processor and a slave device such as a memory chip.

Exception An interrupt to a processor caused by an undefined or illegal instruction. Properly written code will not generate exceptions. Malicious code that was decrypted and as a result is turned into random, chaotic instructions will eventually create an exception.

Indexed Address An address pointing to a location in memory that uses a Processor Register 106 to provide a base value. As the Processor Register 106 is incremented or decremented after each access, the memory location for the next access changes without having to modify the instruction itself. This is useful for reading or writing data from or to adjacent memory locations, such as in a temporary data buffer.

Extended Address An address that points to a location in memory that is not referenced to a Processor Register 106. This is useful for accessing the start of instructions in a Boot Code 101b, or for input and output devices such as disk drives, whose addresses do not change.

Immediate Data Data that is part of an instruction. For example, assume a certain command must be written to a disk drive in order for it to power up before files can be read from or written to it. An immediate data value will be loaded into a Processor Register 106 by an instruction, followed by another instruction which writes the Processor Register 106 containing the immediate data to the disk drive controller. The immediate data will contain a command that tells the disk drive to spin up so it can be accessed.

Level of Trust Most computer systems today, especially those that connect to the internet, have multiple levels of priorities, or "trusts". Lower levels of trust are assigned to those processes that are typically used by processes contending with external Input/Output (I/O) devices, while the higher levels of trust are assigned to those processes that manage mass storage devices and load instructions into memory. This is because those processes dealing with external I/O are more easily compromised and therefore should not be given access to critical resources inside the computer system.

Unmaskable Exception An exception is an internally generated interrupt, an interrupt being an event that requires immediate attention of the processor and therefore must pause, or "interrupt" existing code execution to attend to the event. Unmaskable interrupts, including unmaskable exceptions, are events so grievous that that cannot be deferred by masking them off. In general, when an unmaskable interrupt occurs, all maskable interrupts are blocked (masked) to prevent them from interrupting the process that services the unmaskable interrupt, including unmaskable exceptions. Most processors will reset themselves if they are in the process of servicing an unmaskable exception and another unmaskable exception occurs before the event that caused the first unmaskable exception has been resolved.

Program Counter A register inside a processor that points to where instructions are read from memory for execution. Memory accesses by the program counter are easily distinguishable by logic inside the processor from any other memory access, and thus memory contents accessed by a program counter can be routed to a decryption engine while all other memory accesses bypass decryption circuitry.

Deterministic delay A delay from one event to another that is always the same or nearly the same length of time, resulting in predictable outcomes based on the length of this delay. Indeterministic delays are the opposite, that is, delays whose elapsed time from one event to another is sufficiently random that it is unpredictable.

The following acronyms may be used in drawings and in these descriptions:
ALU Arithmetic Logic Unit
BOA Buffer Overflow Attack
EDC Encryption and Decryption Circuitry
CER Command Encryption Register
EDC Encryption and Decryption Circuitry
I²C Inter-Integrated Circuit
IEC Instruction Execution Circuitry
NVM Non-Volatile Memory
PCB Printed Circuit Board
PMI Processor Memory Interface Instructions are read from Memory 101 (see FIG. 1, FIG. 2, FIG. 3, or FIG. 4) by a Program Counter, which is one of several Processor Registers 106 (see FIG. 1) inside the processor. The Program Counter is the register that points to where the next instruction will reside in Memory 101. As the instruction is read from Memory 101, it is placed in a holding register called the Instruction Register 103 (IR). The IR 103 holds the instruction so that the Instruction Execution Circuitry 102 (IEC) can decode the instruction and issue commands to the processor's Arithmetic Logic Unit (ALU) 107, Processor Registers 106, Flags 108, a Temporary Register 109, the IR 103, and the Processor's Memory Interface 105 (PMI). Data or addresses flow between the different elements of a processor over an Internal Processor Bus 104. Flags 108, which represent certain processor states and priority levels as well as the status of certain results from the execution of previous processor instructions, are changed as a result of an ALU 107 operation or an instruction. The Flags 108 may influence the results of subsequent ALU 107 operations and will influence the sequence of conditional branch instructions (a conditional branch instruction will change the value of the Program Counter in one of two ways, depending on which condition is specified and the state of the Flags 108, for example, "Branch if Zero" means that if the Zero Flag is set, indicating the previous ALU instruction ended up with a result of zero, then the Program Counter is changed to some value other than the next instruction, while if the Zero Flag is clear, then the Program Counter continues to go to the next instruction after the "Branch if Zero" instruction). The Temporary Register 109 is a register that is not referenced directly in any instruction from Memory 101 but is used by the IEC 102 to temporarily hold ALU 107 results until another register, either one of the Processor Registers 106, the Flags 108, the ALU 107, or the PMI 105 can use it.

The arrangement shown in FIG. 1 is a representative typical arrangement of registers and logic inside a processor and is not to be construed as limiting the scope of the claimed subject matter. Note that for clarity, the Processor Registers 106, ALU 107, Flags 108, and Temporary Register 109 are not shown in FIG. 2, FIG. 3, and FIG. 4 although they can be assumed to be represented in all of them by the presence of the Internal Processor Bus 104 in FIG. 2 or FIG. 3, of a pair of specialized Internal Processor Busses 401, 402 in FIG. 4. Also note that in the processor architecture shown in FIG. 1 all addresses needed by the PMI 105 may be generated for the processor utilizing the Temporary Register 109 and do not require separate address generation circuitry. This architecture is not to be construed as limiting the scope of the claimed subject matter. There are other processor architectures that utilize dedicated circuitry to generate addresses for Memory 101 that also fall within the scope of the claimed subject matter.

The sequencing of the commands from the IEC 102 implements the instruction and provides for the desired outcome of the instruction. Succeeding instructions are read sequentially from Memory 101 and executed in sequence, providing a deterministic outcome that can repeat itself over and over again with a very, very high degree of reliability. This high reliability and repeatability has lead to the use of processors to control and implement much of the more tedious and boring tasks in society, as well as provide new features that a generation or two ago were inconceivable.

At least one embodiment (see FIG. 2) provides a method of encrypting the instructions before they are placed in a Memory 101 called Main Memory 101a. Main Memory 101a is read/write Memory 101 where the operating system, processes working under it, and data for the process(es) reside while the processor is operating. The encryption algorithm is seeded by a randomly generated number called the 'Seed Value' whenever a processor comes out of reset. Ideally the Seed Value will be different each time the processor comes out of reset. The Seed Value is not made known outside of the processor. Boot Code 101b instructions, which are instructions that start up a processor after it has been reset, will use a random number generator algorithm or a random number generator function in the processor to randomly create the Seed Value. The Seed Value is then stored in a Command Encryption Register 202 (CER). The Seed Value will be used to change a combination of bits in the instruction into different values, a unique and different value for each possible value the instruction can assume. Subsequently, when the Boot Code 101b begins to load the processor's operating system into Main Memory 101a from a mass storage device such as a disk drive, it takes each instruction and encrypts it with the encryption algorithm controlled by the Seed Value that was previously placed in the CER 202. After the instruction is encrypted, it is then stored in Main Memory 101a. Note that to use this embodiment, the processor must know which commands are intended for the IR 103 and which commands are intended to go to the ALU 107, the Flags 108, or Processor Register 106, so that it will only encrypt those commands intended for the IR 103.

Figure 2:
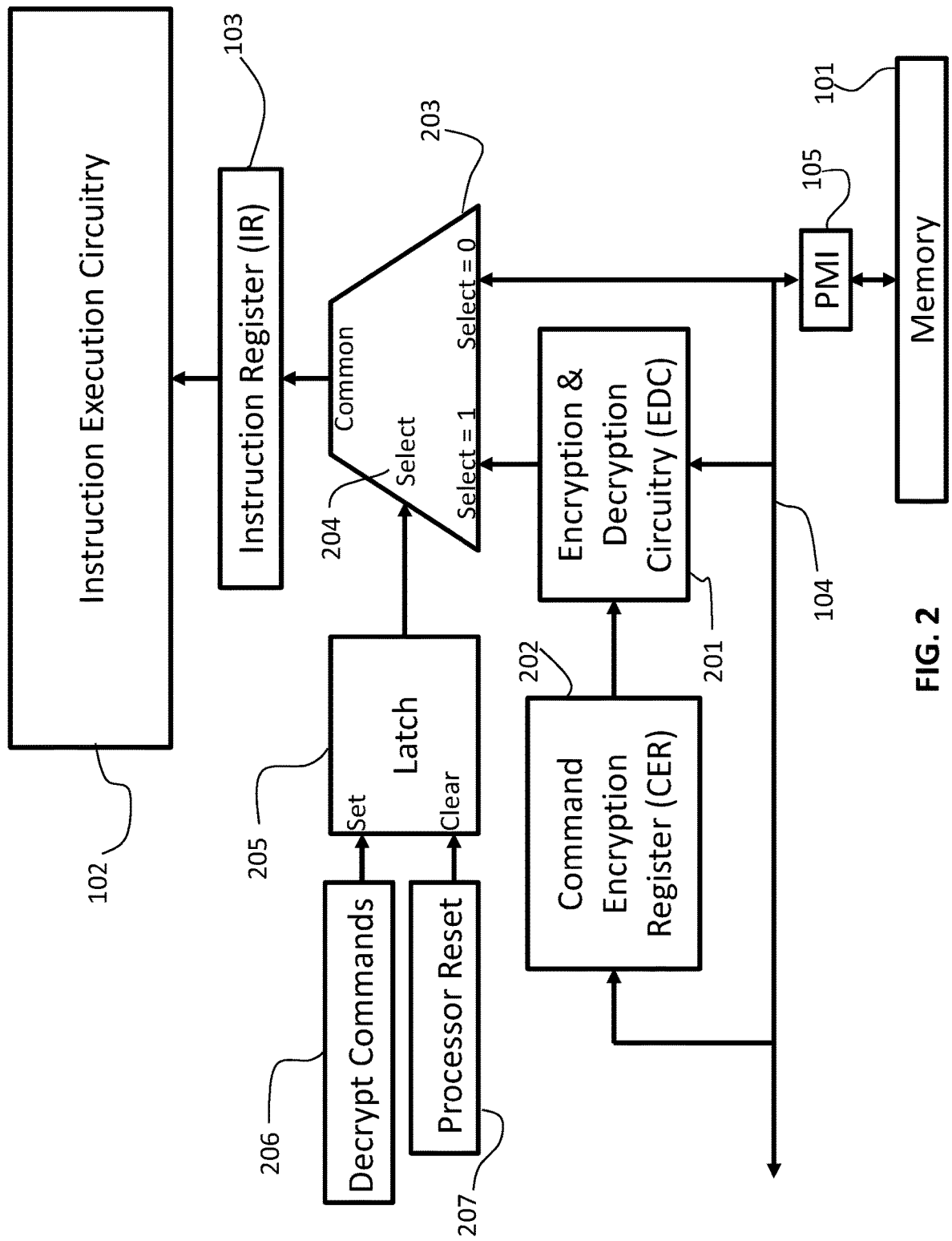
FIG. 2 depicts an arrangement according to at least one embodiment.
Figure 3:
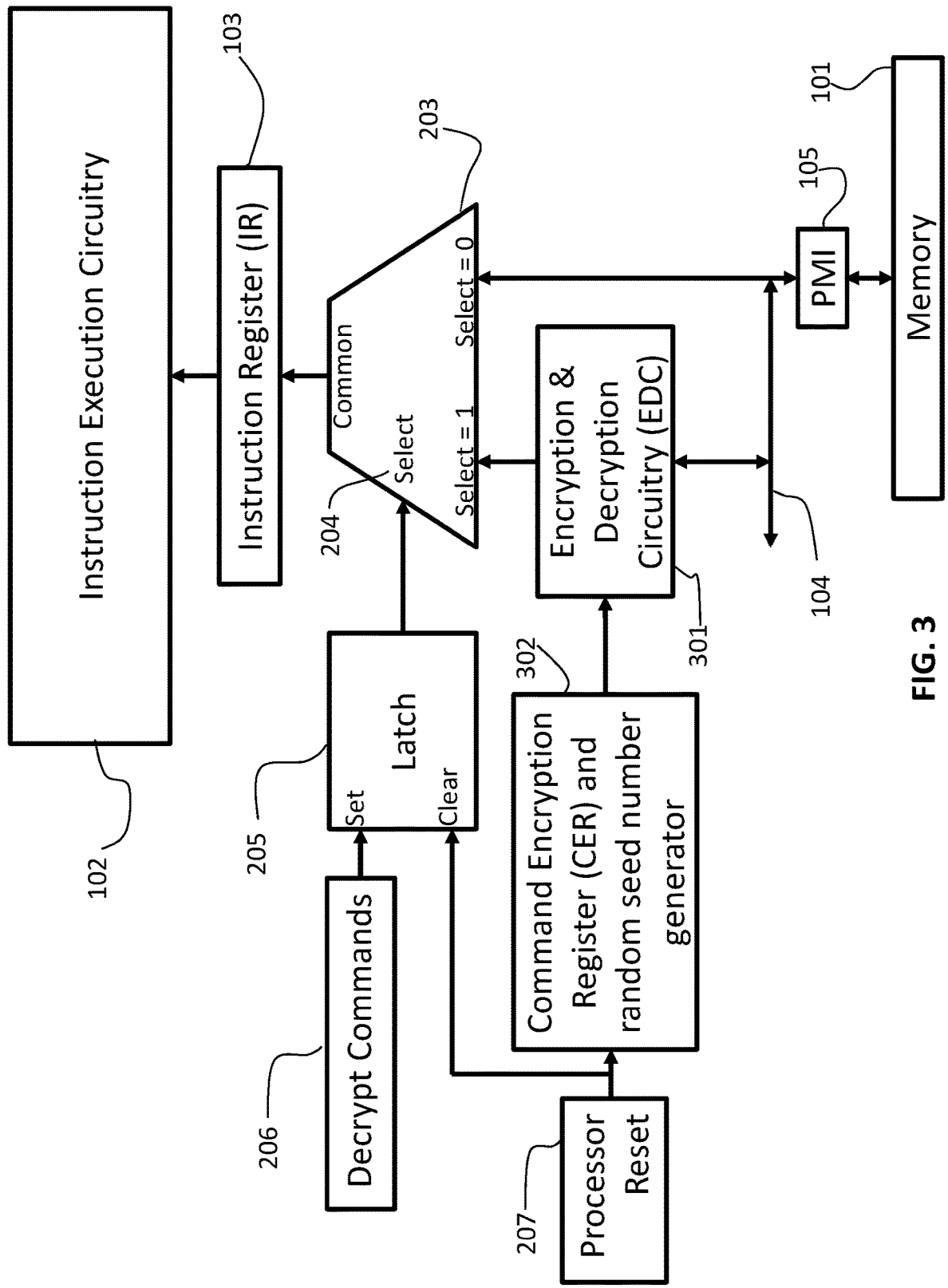
FIG. 3 depicts an enhanced example of the embodiment in FIG. 2.
Figure 4:
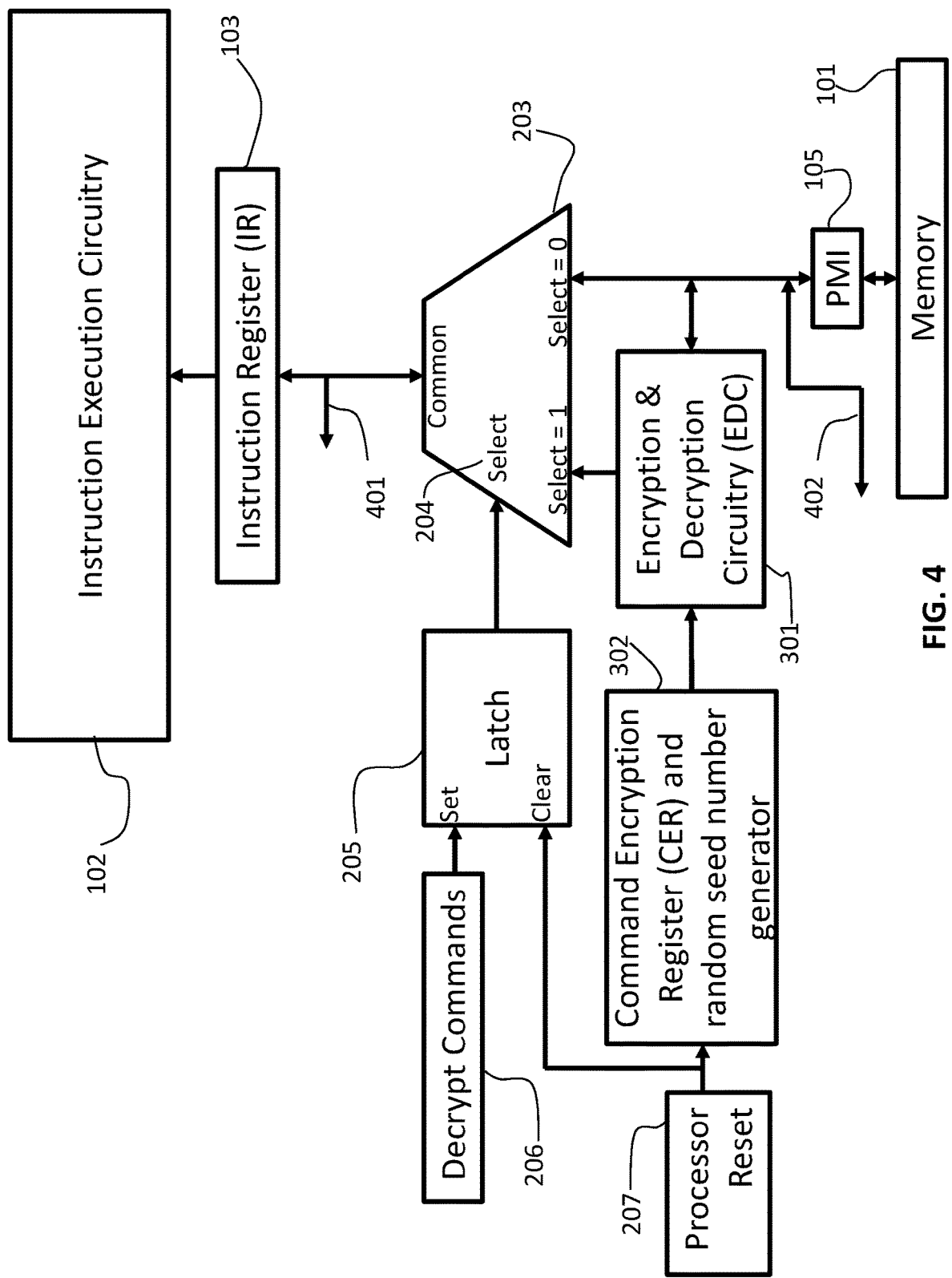
FIG. 4 depicts a more enhanced example of the embodiment in FIG. 3.

Once enough of the operating system has been stored in Main Memory 101a for it to take over, the Boot Code 101b will simultaneously 1) instruct the processor to start executing code from Main Memory 101a where the operating system has been stored and 2) sends the Decrypt Command 206 to a Latch 205 (see FIG. 2, 3, or 4). The output of Latch 205 drives a Select input 204 into a "2 to 1 Multiplexor" 203 (Multiplexor) in FIG. 2, FIG. 3, or FIG. 4, that will select decrypted instructions from the Encryption & Decryption Circuitry 201 (EDC) in FIG. 2 or EDC 301 in FIG. 3 or FIG. 4 to go into the IR 103. The IEC 102 will instruct the IR 103 when to store a value on the Internal Processor Bus 104 (FIG. 1) or the common output of the Multiplexor 203 (FIG. 2, FIG. 3, or FIG. 4) into itself, so that it won't accidentally store other data that may be present on its inputs.

Once instruction decryption begins, Latch 205 cannot be switched back to selecting un-decrypted instructions except by a processor reset 207. This is necessary as all instructions in Main Memory 101a are now encrypted and must be decrypted each time they are read of out of Main Memory 101a before being sent to the IR 103, as decrypted commands are not written back out to the Main Memory 101a.

The method of how the processor selects decrypted instructions or un-decrypted instructions must be such that when the Latch 205 is set it always selects decrypted instructions, and when Latch 205 is not set (that is, it is in a clear state after a reset), it always selects un-decrypted instructions. As an example of how this is accomplished, in FIG. 2, FIG. 3, or FIG. 4 a Multiplexor 203 is shown implementing this needed feature. The Multiplexor 203 is shown as an example of how this function is implemented, and does not limit the scope of the claimed subject matter to using only a Multiplexor 203. Other methods of selecting decrypted instructions when Latch 205 is set or un-decrypted instructions when Latch 205 is clear are within the scope of the claimed subject matter.

Because the instructions stored in Main Memory 101a are now encrypted and the Seed Value is unknown to the outside world, malicious users will have to guess at what the Seed Value is, and perhaps even the encryption algorithm. If the malicious user guesses wrong, then when the malicious code placed in Main Memory 101a is decrypted, it isn't turned into the desired instructions. Instead it is turned into random, unpredictable values. The unpredictable instructions produce chaotic results. Because the results are chaotic and do not produce a deterministic result, the processor will not be taken over by the malicious user. Eventually the random, chaotic results will generate an 'exception', which is an interrupt to the processor caused by misbehaving code. The exception handler code in the processor will know what part of Main Memory 101a the code was being executed out of when the exception occurs, and will compare its contents (after decrypting it) with what should be there. If there is a difference, the processor will assume it has suffered a BOA and either 1) stop the process that resided in the compromised block of Main Memory 101a, and reload it, or 2) reset itself.

Note that each reset should generate a different random number for the Seed Value. Hence the malicious user will not know if a previously unsuccessful guess would have actually been the new Seed Value; in other words, after a processor reset, the malicious user will have to start all over again trying to guess what the Seed Value is. Frequently the malicious user will also be unaware of when a processor targeted by the malicious user is reset, further adding to the uncertainty facing the malicious user.

Since the feedback mechanism between implementing the BOA and determining if the results are successful is extremely slow, an encryption algorithm that implements a reasonably large number of different permutations would take many decades for the malicious user to successfully guess at the correct algorithm. The net result is that the malicious user will tire of their efforts to take control of the processor and stop their BOA attacks. Further, by resetting the processor on a periodic basis or after several unsuccessful BOA attacks have been detected, any past record of known guesses as to what the Seed Value is by a malicious user are rendered useless because after a reset the Seed Value will be different, and in fact could be that one of those past attempts would now be the new Seed Value. The malicious user would have to start over again, but due to the nature of their being unsuccessful in implementing a BOA attack, they would have difficulty even knowing that their targeted processor was reset and thus requiring them to start over again, further frustrating their efforts.

In at least one embodiment, the Encryption and Decryption Circuitry 301 (EDC) in FIG. 3 or FIG. 4 is used to encrypt commands before writing them to Main Memory 101a, saving the processor of the job of having to do so. A further advantage of this is that if the CER 302 also contains a random number generator in it that generates the Seed Value without assistance from the rest of the processor, then the rest of the processor is not aware of the encryption algorithm or Seed Value, further enhancing security. In this embodiment, after a Seed Value is stored in the CER 202, an unencrypted instruction is then written to the EDC 301 to be encrypted. The encrypted instruction is read out of the EDC and written to Main Memory 101a. For processors sold on the open market, keeping the details of the encryption algorithm and Seed Value secret from the processor will make BOA attack attempts even more difficult, as a processor could never unintentionally divulge either.

The encryption algorithm may actually be one of several different algorithms, not all of which are used in any one processor. To select which algorithm(s) is used can be done by a number of means. In a typical example shown in FIG. 5, an external serial read-only memory 501 is accessed over a serial bus such as the Inter-Integrated Circuit (I²C) bus 504 which selects which of the several available algorithms are to actually be used. The serial read-only memory 501 can be programmed at the time a bed of nails tester or other method of verifying the electrical connections in a printed circuit board are verified. Each production unit can have a random selection of which algorithms are used by programming different values in each serial read-only memory 501 during testing. Once programmed, a write inhibit feature prevents further updates to the serial read-only memory 501. The selected algorithms can vary from board to board, which means no one on the 'inside' of Printed Circuit Board (PCB) manufacturing environment will know what algorithm is in use on a lot of boards, as each PCB in a lot of PCBs can use a different combinations of algorithms.

In at least one embodiment shown in FIG. 4, not only the instructions intended for the IR 103, but data values that may be written to Internal Processor Registers 106, data values presented to the ALU 107, or data values written to the Flags 108 are also encrypted and therefore they must also pass through the EDC 301. This embodiment means that the processor does not have to distinguish between instructions that go into the IR 103 versus instructions that go other internal destinations. This requires the use of a second bus 402 that takes the un-encrypted values read from the PMI 105 and passes them to the Internal Processor Registers 106, the ALU 107, or the Flags 108. The CER 102 will then decide whether to use the decrypted bus 401 or un-decrypted bus 402 to pass data to the Internal Processor Registers 106, the ALU 107, or the Flags 108. Examples of what may be unencrypted would be data or status from IO device, so these must pass over the un-decrypted bus 402 to go into an internal destination inside the processor.

Decryption algorithms should minimize any delay, or have no delay placed on the flow of an instruction from Memory 101 to the IR 103. As there may be some delay in the decoding logic, it may be necessary to 'pipeline' the instructing and use an additional stage of registers.

During the instruction debugging phase, it may be desirable to disable the EDC 301 so that it does not modify any instruction passing through it. An external pin (not shown in the drawings) on the processor may be used to force the Seed Value in the CER 302 or CER 202 to assume a state that does not encrypt or decrypt instructions. By allowing the signal to float when encryption is to be enabled, or connecting the pin to a low voltage signal such as the ground return signal when encryption is to be disabled, the option to enable or disable encryption is implemented. An optional resistor that is taken out of the bill of materials of a PCB design for production PCBs will provide the needed connection to the ground return line during the debugging phase in a laboratory setting. But by not being inserted for PCBs delivered to customers, the missing resistor ensures that the encryption to stop BOA will be implemented. This is an example of how encryption/decryption can be disabled for troubleshooting but enabled for production PCBs, however, this method of selectively enabling or disabling encryption by a hardware means does not limit the scope of the claimed subject matter to just this one method.

Two suggested encryption and decryption algorithms are 1) using the Seed Value, invert selected bits in the instruction, and 2) taking groups of four bits in each instruction, use the Seed Value to swap their positions around. Neither algorithm depends on the state of a bit in the instruction to determine the final outcome of another bit in the instruction. Both algorithms preserve the uniqueness of every bit in the instruction so that the instruction can be faithfully reconstructed during decryption, and both algorithms minimize the amount of logic needed to implement them. It will take one bit of a Seed Value for each bit in the instruction to implement the inversion algorithm, and it will take five bits of a Seed Value for each four bits in the instruction to implement the suggested bit swapping algorithm. For a 32 bit instruction, the two algorithms provide $2^{32}$ and $24^8$, respectively, different permutations; combined they provide over $4.7 \times 10^{20}$ permutations. Larger instructions will involve even larger numbers of permutations. Due to the slow speed by which feedback back to the malicious user on the success or failure of a particular guess is, the number of permutations from a 32 bit instruction alone will be adequate to discourage all future BOA attacks. For 64 bit instructions, the processor's silicon will wear out long before a malicious hacker could ever stumble across the correct Seed Value and algorithm.

FIG. 1 depicts an embodiment of the prior art. There is no instruction encryption or decryption circuitry in it. It also details an example of a processor implementation that was left out of FIG. 2, FIG. 3, and FIG. 4 for clarity but can be assumed to be present in them.

FIG. 2 depicts an embodiment that requires the Boot Code 101b to generate the random Seed Value for the encryption algorithm and save it in the Command Encryption Register (CER) 202, and for additional files to be saved with the operating system and all other executable files that will inform the processor which locations in the executable files need to be encrypted and which ones do not. With reference to FIG. 2, Internal Processor Bus 104 leads to other destinations (ALU, registers, etc.) for memory content, or post-Instruction processing such as memory address generators).

FIG. 3 depicts an enhanced embodiment of the embodiment in FIG. 2. In this enhanced embodiment the Command Encryption Register 302 (CER) possesses an internal random number generator to create the Seed Value after a reset and keep its contents unknown to the processor. Because the processor cannot read the Seed Value out of the CER 302, it must use the EDC 301 to encrypt instructions before they are written to the Main Memory 101a, and the EDC 301 will also be used to decrypt instructions when the processor must determine if it is the victim of a BOA attack. The EDC 301 in the figure will also possess numerous possible algorithms, only a small handful will actually be implemented randomly to help further frustrate the efforts of malicious users. With reference to FIG. 3, Internal Processor Bus 104 leads to other destinations (the PMI 105, Internal Processor Registers 106, the ALU 107, or the Flags 108) for memory content, or post-Instruction processing such as memory address generators).

FIG. 4 depicts a more enhanced embodiment of the embodiment in FIG. 3. The additional enhancement provides a means of selected decrypted instructions 401 or selecting unencrypted data 402 from the PMI 105 to load the Internal Processor Registers 106, the ALU 107, or the Flags 108. The selection multiplexor is not shown in FIG. 4, although its function is similar to the Multiplexor 203. The selection between decrypted instructions 401 or un-decrypted data 402 is controlled by the IEC 102. The additional enhancement means that the processor does not need to identify which instructions are intended for the IR 103 and which ones are not during the encryption process while writing the executable code to Main Memory 101a. Therefore no additional files identifying the locations of the instructions intended for the IR 103 are needed, as all instructions will be encrypted. With reference to FIG. 4, bus 402 leads to other destinations (the PMI 105, the Internal Processor Registers 106, the ALU 107, or the Flags 108) for Memory 101 content that are not part of the instruction sequence for the processor (i.e., Input or Output accesses, indexed or extended memory accesses); and bus 401 leads to other destinations (the PMI 105, the Internal Processor Registers 106, the ALU 107, or the Flags 108) for memory content that are part of the instruction sequence for the processor.

Figure 5:
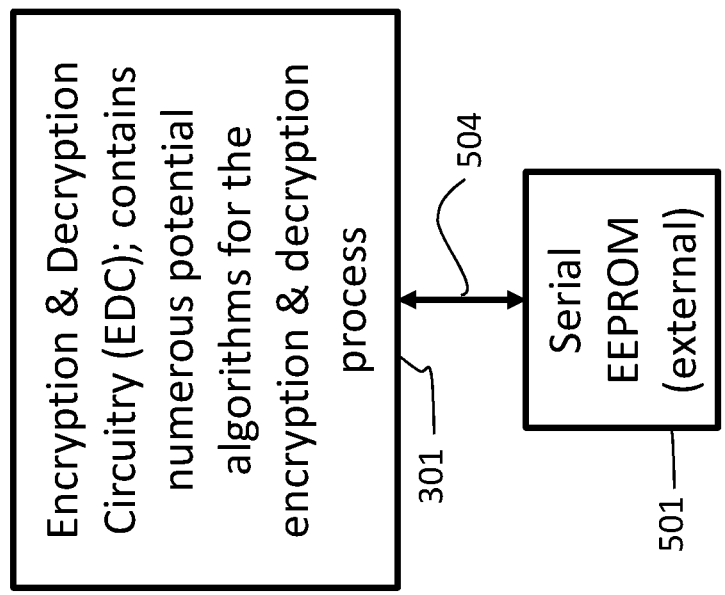
FIG. 5 depicts a simplified example by which multiple algorithms may exist, and each of which would encrypt or decrypt instructions differently.

FIG. 5 depicts a simplified example of a means by which multiple algorithms may exist in the CER 302 each of which would encrypt or decrypt the instructions differently. However, only some of the algorithms are selected for use depending on what is programmed into a serial Electrically Erasable Programmable Read Only Memory 501 (EEPROM) during testing of the PCB that the processor will be placed in.

A novel concept is implemented to modify the bit arrangement and bit states of instructions for a processor with the goal rendering a malicious user unable to execute a successful BOA. In at least one example, the modification technique used can provide more than $4.7 \times 10^{20}$ permutations on the changes to the bit arrangement and bit states. Given the slow rate with which a malicious user would get feedback on the success or failure of each attempted BOA, it would take many decades for the malicious user to eventually come to the correct permutation. Each time a processor is reset, a different permutation is typically used. This renders all previous failed attempts of a BOA, which the malicious user would use to indicate the permutations that are invalid, mute, as the new permutation after a reset could be one of those permutations the user previously tried and determined were incorrect.

In some embodiments, all processor instructions written to Main Memory 101a are to be encrypted with the selected permutation, so that when an encrypted instruction is read from Main Memory 101a and decrypted, the instruction will be restored to its original value. To enable this to happen, after reset the processor will not decrypt any instructions while it executes said instructions from a special memory called Boot Code 101b. Boot Code 101b are instructions stored in a non-volatile memory, and having a further attribute that Boot Code 101b is not intended to be changed, unlike code written to a modifiable non-volatile memory such as a disk drive.

The Boot Code 101b will bring the processor and a minimum set of its input/output components to a known operating state after each reset. In one embodiment it will generate a Seed Value for instruction encryption and decryption. The Boot Code 101b will load the instructions for the processor's operating system into Main Memory 101a, encrypting the instructions prior to writing them to Main Memory 101a.

After enough of the operating system has been written to Main Memory 101a for the Boot Code 101b to transfer code execution to Main Memory 101a, the Boot Code 101b executes a command that simultaneously starts executing instructions out of the Main Memory 101a and enables instruction decryption to occur.

Many processors have a special, internal memory called 'Cache', which is a volatile memory that is accessed a lot more quickly than Main Memory 101a or Boot Code 101b. The purpose of Cache 101c is to hold the most commonly used instructions and data inside the same integrated circuit the processor is in so it can operate faster, as well as freeing up the integrated circuit's external memory interface so data can flow into and out of the processor without being slowed down by accesses to frequently used instructions. As such, Cache 101c will contain a copy of the contents of Main Memory 101a or Boot Code 101b that was recently read from or written to.

Prior to executing the instruction to start decryption, much of the Boot Code 101b may be stored in Cache 101c. As this Boot Code 101b in Cache 101c is unencrypted, it must be 'flushed' or declared invalid so there will be no further attempt to use it once instruction decryption starts. If decryption starts without doing so, any Boot Code 101b that is accidentally executed will be changed to unintelligible instructions by the decryption process. That could cause the processor to behave erratically, so the Cache 101c contents must be declared invalid to prevent them from being accessed after decryption starts. If the processor operating system deems that it must execute more Boot Code 101b, it must read the Boot Code 101b, encrypt it and then store it in Main Memory 101a for execution just like it would do so for its operating system or any other code that it reads from a disk drive.

If a BOA attack occurs on the processor, the malicious code that will be executed will be rendered unintelligible by the decryption process. Unintelligible code will quickly result in a error event called an 'exception'. An exception can include errors such as accessing non-existent memory, a lower priority operating state accessing memory reserved for a higher priority state, attempting to write to memory that is write protected, executing an unimplemented instruction, accessing an IO device reserved for a higher priority state, dividing by zero, etc. Once one of these errors occurs, the processor will save its register contents for later analysis and then jump to a higher priority operating state. From this higher priority state the processor will examine the instructions in the Main Memory 101a where the exception occurred and compare them with what should be in that location by reading what was loaded there from the disk drive. If it finds a mismatch, the processor should assume it has suffered a BOA attack and shut down the process that uses that portion of Main Memory 101a and reload it, or if it determines it has suffered multiple BOA attacks or cannot shut down that process, the processor resets itself.

Additional instructions need to be added to the processor to enable the encryption and decryption process to occur. One instruction will be the previously mentioned instruction of beginning to execute encrypted code, which involves transferring program control to another part of memory, turning on the decryption process, and for processors with Cache 101c, declaring the entire Cache 101c contents invalid.

In an enhanced embodiment, another instruction will be to store an unencrypted value in a register associated with the EDC 301 and read out an encrypted version of it. Another instruction will be to write an encrypted value in a register associated with the EDC 301 and reading out the unencrypted value. These instructions will ease encryption and debugging, and for systems with a Seed Value the processor is not allowed to read, provide the only means of encrypting instructions and examining an area of memory where an exception occurred to determine if the processor has suffered a BOA.

An enhanced embodiment will provide a means of generating a Seed Value for the encryption and decryption process that cannot be read by the processor. This enhances security in that the Seed Value cannot be accidentally disclosed. Note that for debugging purposes it may be necessary to suppress the Seed Value so that there is no encryption or decryption, therefore, the voltage level on an input pin into the processor can allow or deny the processor the ability to use its Seed Value.

Another enhanced embodiment will decrypt not just actual instructions, but any data in the instruction stream such as immediate data, indexed addressing values or extended addresses. This enhanced version does not require the processor to seek out instructions meant only for the IR 103 in the instruction stream to be encrypted while leaving any addressing information or immediate data unencrypted; all can be encrypted.

Another enhanced embodiment will have an encryption and decryption circuitry possessing multiple different possible algorithms, with the actual algorithms that will be used by the processor randomly selected during the processor's PCB manufacturing. By assigning a different set of algorithms to each PCB in a PCB lot, it will not be possible for someone intimately familiar with the manufacturing process to be able to sell information as to which algorithms were used for a particular lot of PCBs.

Another enhanced embodiment discloses a digital processor that internal to the processor integrated circuit distinguishes between memory contents accessed by a program counter and memory contents accessed by any other means. The purpose is to provide for the decryption of memory contents accessed by the program counter while allowing all data and I/O device accesses, which are not accessed by the program counter, to remain undecrypted after the decryption process starts.

In some embodiments, a seed value may be used to encrypt and decrypt instructions. Encryption and decryption circuitry may be included such that when the seed value is a certain value, no encryption or decryption takes place. This functionality provides a means of masking off the seed value after a processor reset so the seed value appears as if it were set to said known value to not allow any encryption or decryption to take place for the purpose of allowing boot code which is unencrypted to be properly executed after a processor reset. Additionally this functionality provides a means of masking off the seed value during code debugging such that the instructions will be in their unencrypted form and thus will be the same in memory as they will be in when they enter the Instruction Register (IR), the purpose of which is to enable software engineers and other code developers the ability read code values stored in memory without having to decrypt such values to examine them and possibly modify them as needed to debug code.

In some embodiments, a special control bit may force the seed value to continue to be masked off. The purpose of said control bit to allow for software engineers or other code developers to not have to contend with encrypted and thus unrecognizable opcodes stored in memory while developing and debugging software.

In some embodiments, the special control bit may configured to not mask off the seed value after a processor reset to allow encryption and decryption to take place by default. The special control bit may only be read from or written to by the highest level of trust of a processor system and may only be written to before decryption is allowed.

In some embodiments, an unmaskable exception may occur when an access attempt to the special control bit that forces the seed value to continue to be masked off occurs by any process operating in any but the highest level of trust of a computer system.

In some embodiments, an unmaskable exception occurs when a write attempt to the special control bit that forces the seed value to continue to be masked occurs to after the decryption process is started.

In some embodiments, only the highest level of trust of a computer system may execute a command to enable decryption to take place.

In some embodiments, an unmaskable exception may occur when an attempt to execute a command to enable decryption to take place is done by any process operating in any but the highest level of trust of a computer system.

In some embodiments, an instruction may exist that both writes to and then reads from an encryption register. Once the write portion of the instruction is initiated, the read sequence cannot be interrupted. This allows the read of the encryption register to complete and the value read from the encryption register to be stored in a register inside the processor and/or a memory location.

In some embodiments, an unmaskable exception may occur when an attempt to access the encryption register is done by any process operating in any but the highest level of trust of the computer system.

In some embodiments, a minimum of two different types of encryption algorithms may be implemented. The purpose of which is to create a sufficient number of permutations to make it so unlikely that a BOA or other attempt to corrupt memory with unauthorized instructions will be successful that such memory corruption attempts will be successfully detected. As such, giving the processor the option to either stop, then re-start the corrupted process, or to reset.

In some embodiments, the digital processor may be further configured to capture a random number for the seed value when the first access to the encryption register occurs. The purpose of this capture is to use the more indeterministic delays created by accessing mass storage devices. This to occur before accessing an encryption register for the purposes of changing the time difference between the completion of a reset and when the seed value is captured. As such, the probability is increased that the seed value will be more random than if the seed value were to be captured using more deterministic delays after a reset.

In some embodiments, the digital processor may be further configured to use the previous seed value prior to the previous processor reset as the seed for a random number generator to generate a new random number for seed value for the encryption/decryption process. The purpose of which is to increase the probability that the new seed value is more random than would occur if the random number generator always started from the same starting point to generate a random number.

Another enhanced embodiment discloses a digital processor that internal to the processor IC distinguishes between memory contents accessed by the stack pointer and memory contents accessed by any other means. The purpose of which is to provide for the encryption of the return address for the program counter when pushing the program counter contents (the return address) onto the stack during a subroutine call or at the beginning of an interrupt, and to provide for the decryption of the return address before loading it into the program counter when pulling the program counter during a return from interrupt or return from subroutine instruction.

In some embodiments, the digital processor may be further configured to use only a part of the encryption process to encrypt the program counter during a subroutine call. The purpose of which is to prevent malicious code from calling subroutines just to explore the differences between the program counter outside the subroutine and what is stored on the stack and thereby deduce what the SGRN value is, or to use a different SGRN value for encrypting and decrypting the return address than what is used for encrypting and decrypting instructions.

What is claimed is:

1. A digital processor implemented internal to a processor integrated circuit (IC) and configured to distinguish between memory contents accessed by the program counter and memory contents accessed by any other means, the purpose of which is to provide for the decryption of memory contents accessed by the program counter while allowing all data and I/O device accesses, which are not accessed by the program counter, to remain undecrypted after the decryption process starts, wherein the digital processor includes a seed value used to encrypt and decrypt instructions, and encryption and decryption circuitry such that when the seed value is a certain value, no encryption or decryption takes place, to provide for:
   a means of masking off the seed value after a processor reset so the seed value appears as if it were set to said known value to not allow any encryption or decryption to take place for the purpose of allowing boot code which is unencrypted to be properly executed after a processor reset; and
   a means of masking off the seed value during code debugging such that the instructions will be in their unencrypted form and thus will be the same in memory as they will be in when they enter the Instruction Register (IR), the purpose of which is to enable software engineers and other code developers the ability read code values stored in memory without having to decrypt such values to examine them and possibly modify them as needed to debug code.

2. The digital processor according to claim 1, which contains a special control bit that forces the seed value to continue to be masked off, the purpose of said control bit to allow for software engineers or other code developers to not have to contend with encrypted and thus unrecognizable opcodes stored in memory while developing and debugging software.

3. The digital processor according to claim 2, wherein the special control bit that forces the seed value to continue to be masked off:
   is configured to not mask off the seed value after a processor reset, that is, allow encryption and decryption to take place by default; and
   can only be read from or written to by the highest level of trust of a processor system, and
   can only be written to before decryption is allowed.

4. The digital processor according to claim 3, wherein an unmaskable exception occurs when an access attempt to the special control bit that forces the seed value to continue to be masked off occurs by any process operating in any but the highest level of trust of a computer system.

5. The digital processor according to claim 3, wherein an unmaskable exception occurs when a write attempt to the special control bit that forces the seed value to continue to be masked occurs to after the decryption process is started.

6. The digital processor according to claim 1, wherein only the highest level of trust of a computer system may execute a command to enable decryption to take place.

7. The digital processor according to claim 1, wherein an unmaskable exception occurs when an attempt to execute a command to enable decryption to take place is done by any process operating in any but the highest level of trust of a computer system.

8. The digital processor according to claim 1, wherein an instruction exists that both writes to, then reads from, an encryption register exists where once the write portion of instruction is initiated the read sequence cannot be interrupted, allowing the read of the encryption register to complete and the value read from the encryption register to be stored in a register inside the processor, or a memory location.

9. The digital processor according to claim 1, wherein an unmaskable exception occurs when an attempt to access the encryption register is done by any process operating in any but the highest level of trust of a computer system.

10. The digital processor according to claim 1, wherein a minimum of two different types of encryption algorithms are implemented, the purpose of which is create a sufficient number of permutations to make it so unlikely that a buffer overflow attack (BOA) or other attempt to corrupt memory with unauthorized instructions will be successful that such memory corruption attempts will be successfully detected, giving the processor the option to either stop, then re-start the corrupted process, or to reset.

11. The digital processor according to claim 1 further configured to capture a random number for the seed value when the first access to the encryption register occurs, the purpose of which is to use the more indeterministic delays created by accessing mass storage devices which needs to occur before accessing an encryption register for the purposes of changing the time difference between the completion of a reset and when the seed value is captured, thus increasing the probability that the seed value will be more random than if the seed value were to be captured using more deterministic delays after a reset.

12. The digital processor according to claim 1 further configured to use the previous seed value prior to the previous processor reset as the seed for a random number generator to generate a new random number for seed value for the encryption/decryption process, the purpose of which is to increase the probability that the new seed value is more random than would occur if the random number generator always started from the same starting point to generate a random number.

13. A digital processor implemented internal to a processor integrated circuit (IC) and configured to distinguish between memory contents accessed by the stack pointer and memory contents accessed by any other means, the purpose of which is to provide for the encryption of the return address for the program counter when pushing the program counter contents (the return address) onto the stack during a subroutine call or at the beginning of an interrupt, and to provide for the decryption of the return address before loading it into the program counter when pulling the program counter during a return from interrupt or return from subroutine instruction, wherein the digital processor includes a seed value used to encrypt and decrypt instructions, and encryption and decryption circuitry such that when the seed value is a certain value, no encryption or decryption takes place, to provide for:
   a means of masking off the seed value after a processor reset so the seed value appears as if it were set to said known value to not allow any encryption or decryption to take place for the purpose of allowing boot code which is unencrypted to be properly executed after a processor reset; and
   a means of masking off the seed value during code debugging such that the instructions will be in their unencrypted form and thus will be the same in memory as they will be in when they enter the Instruction Register (IR), the purpose of which is to enable software engineers and other code developers the ability read code values stored in memory without having to decrypt such values to examine them and possibly modify them as needed to debug code.

14. The digital processor according to claim 13, wherein only part of the encryption process is used to encrypt the program counter during a subroutine call, the purpose of which is to prevent malicious code from calling subroutines just to explore the differences between the program counter outside the subroutine and what is stored on the stack and thereby deduce what the SGRN value is, or to use a different SGRN value for encrypting and decrypting the return address than what is used for encrypting and decrypting instructions.

* * * * *